United States Patent [19]

Homeyer

[11] 4,358,503
[45] Nov. 9, 1982

[54] GLASS FIBRE REINFORCED PLASTIC SHEETING MATERIAL

[76] Inventor: Harald H. H. Homeyer, 356 Oak Ave., Ferndale, Randburg, Transvaal, South Africa

[21] Appl. No.: 210,710

[22] Filed: Nov. 26, 1980

[30] Foreign Application Priority Data

Dec. 3, 1979 [ZA] South Africa .................. 79/6544
May 23, 1980 [ZA] South Africa .................. 80/3111

[51] Int. Cl.³ .................. B32B 15/08; G02B 5/24;
 B32B 17/04; B32B 27/36
[52] U.S. Cl. .................. 428/285; 350/1.7;
 350/258; 427/160; 428/179; 428/182; 428/286;
 428/458; 428/40; 428/352; 428/413
[58] Field of Search .............. 428/458, 182, 285, 286,
 428/40, 352, 413, 179; 350/1.7, 258; 427/160

[56] References Cited

U.S. PATENT DOCUMENTS 3,308,004 3/1967 Rouault .................. 428/458
3,640,832 2/1972 Kurz .................. 428/458
3,718,528 2/1973 Bergstrom .................. 350/1.7
3,839,129 10/1974 Neumann .................. 428/458
4,009,312 2/1977 Hayashi .................. 428/458
4,093,768 6/1978 Cordts .................. 428/458
4,125,670 11/1978 Perfetti .................. 428/458

FOREIGN PATENT DOCUMENTS 2423211 12/1975 Fed. Rep. of Germany ...... 428/458
1517205 7/1978 United Kingdom .

*Primary Examiner*—Ellis P. Robinson
*Attorney, Agent, or Firm*—Sughrue, Mion, Zinn, Macpeak & Seas

[57] ABSTRACT

A glass fibre reinforced plastic sheet having a radiation reflecting layer extending over its surface area and which is carried by a release film or the like employed in the manufacture of the reinforced plastic sheet to thereby reflect radiation but enable light to pass through the sheet.

10 Claims, 5 Drawing Figures

GLASS FIBRE REINFORCED PLASTIC SHEETING MATERIAL

BACKGROUND OF THE INVENTION

1. Field of the Invention

This invention relates to a glass fibre reinforced plastics material with improved physical properties and to the manufacture of such a material.

2. Description of the Prior Art

Glass fibre reinforced plastics sheeting has a variety of applications and is particularly useful in the building industry where it is suitable for use as a structural element, in particular as a roofing material. The suitability for such use stems from the inherent properties of glass fibre reinforced plastics sheeting which include:

translucency;

corrosion resistance; and a high strength to weight ratio.

However, a problem associated with the use of such sheeting in buildings is the excessive amount of solar radiation that passes through the sheet and into the building.

SUMMARY OF THE INVENTION

One object of the invention is to provide a glass fibre reinforced plastic sheeting material that will reflect away from a building whereon such a sheet is used, at least some of the solar radiation that would otherwise pass through the sheet into the building.

A second object of this invention is to provide a method whereby such a glass fibre reinforced sheet may be manufactured.

In accordance with one aspect of this invention there is provided a glass fibre reinforced plastic sheeting material wherein the sheet has a reflective layer associated therewith and extending over at least a major portion of its area.

A further feature of the invention provides for the reflective layer to be carried by, or be embodied in, a plastic film laminate bonded to the glass fibre sheet. One of the lamina of the plastics film may be an extremely thin layer of aluminium or similar metal or metal alloy. This metallic layer has the property of reflecting, at least a substantial proportion of solar radiation striking the same.

A further feature of the invention provides for the coating of the glass fibre reinforced sheeting or the plastics film with the metallic layer to be effected by a variety of different methods including spraying, precipitation, electro-deposition, electro-plating, vaporization of the metal, or the like.

The glass fibre reinforced sheeting may have any suitable configuration such as a planar sheet, a corrugated roofing sheet or "IBR" sectioned roofing sheet.

Further in accordance with this invention there is provided a method for the manufacture of glass fibre reinforced plastic sheeting material comprising the following steps:

(a) locating a first release sheet onto a lower half of a sheeting die;

(b) spreading glass fibre reinforcing and plastic resin material evenly over the release sheet;

(c) locating a second release sheet over the glass fibre and resin mixture;

(d) closing the sheeting die to mould the glass fibre and resin mixture into the required shape, and (e) allowing the resin to cure in a conventional manner, the method being characterized in that at least one of said release sheets is a plastics film having a reflective layer thereon.

In the above described method, the plastics film has a reflective layer thereon which is preferably provided on one face thereof with a surface composition having physical characteristics to promote a good and effective bond between the surface thereof and the plastics material which is reinforced with glass fibres. Conventionally, the plastics film is a laminate with an extremely thin layer of metal sandwiched between two plastics films bonded together by means of an adhesive. Alternatively, the reflective layer may be carried on one film and simply coated with a protective layer of a suitable material. The metallic or reflective layer could be applied to either sheet in such a case.

It has been found that a highly useful plastics film for the purpose outlined above is a co-extruded polyester film whereof one side is heat sealable as a result of it not being fully polymerized or linked. The other surface is substantially fully polymerized or linked so that it is not heat sealable but may nevertheless be bonded by means of suitable adhesives. In this case the heat sealable side is the one to be contacted with, and thus secured to, the plastics material (usually an epoxy resin) which is reinforced with the glass fibres.

The reflective metal layer is, in this case, sandwiched between the said other surface of the co-extruded polyester film and a simple film (also conveniently a polyester film) adhesively secured thereto. This composite film embodying the reflective metal layer is emminently suitable for use as one of the release sheets in a conventional manufacturing process for the production of glass fibre reinforced plastics sheet materials.

The reflective layer may be of any suitable type but will generally be an extremely thin layer of a metal such as aluminium which is produced on a surface by a process known as metallizing. Such thin layers of metal reflect substantial proportions of radiant energy from the sun while transmitting an appreciable quantity of light.

BRIEF DESCRIPTION OF THE DRAWINGS

Embodiments of the invention are described below by way of example only, and with reference to the accompanying drawings in which.

DESCRIPTION OF THE PREFERRED EMBODIMENTS

Figure 1:
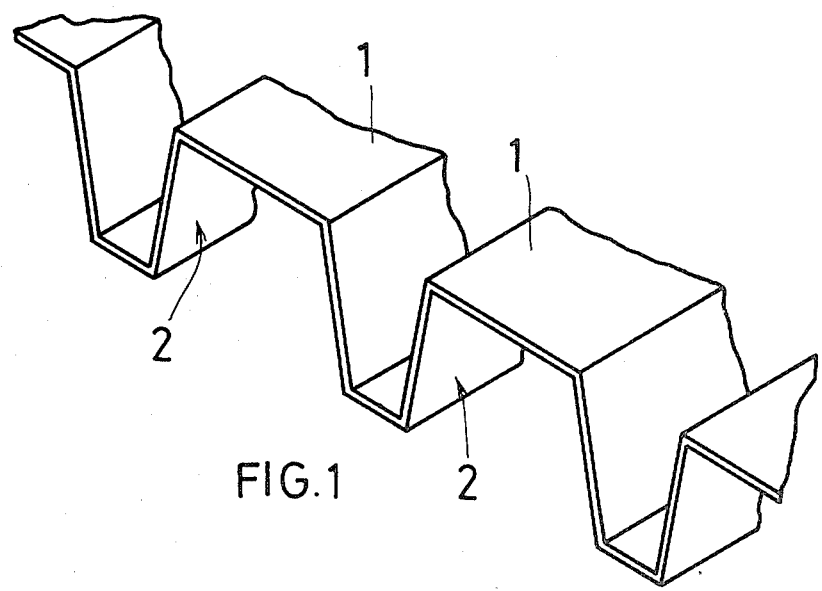
FIG. 1 shows a section through one form of glass fibre reinforced sheeting material.
Figure 2:
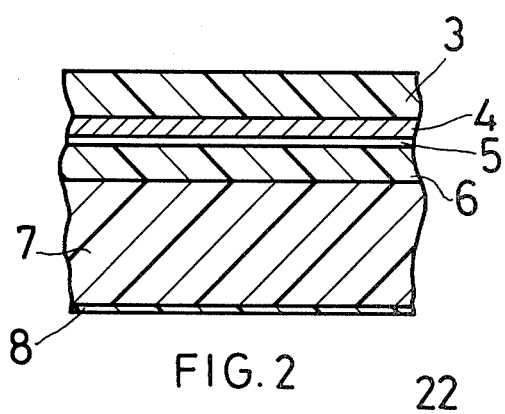
FIGS. 2 and 3 show enlarged cross-sectional configurations of two different embodiments of the invention.

As illustrated in FIG. 1, a glass fibre sheet 1, which in this embodiment of the invention is a typical IBR sectioned roofing sheet, has bonded to its inner surface a reflective plastics sheet 2. This plastics sheet conveniently defines one of the release sheets usually used in the manufacture of such sheets and comprises three layers, namely a plastics film base 3, vacuum coated with an aluminium or other thin metal layer 4, and a protective barrier layer 5. The bonding between the glass fibre sheet 1 and the plastics film base 3 is automatically effected during the manufacturing process.

As mentioned above the composite plastics sheet is preferably defined by a first outer plastics film such as a polyester film 3 having a metallized layer 4 on the inside thereof and which is bonded by means of an adhesive layer 5 onto the non-heat sealable or substantially completely linked or polymerized surface of a co-extruded polyester film 6 of known type. Such co-extruded film 6 is commercially available from Imperial Chemical Industries under their trade name "MELINEX" Type 301. The heat sealable surface of such film automatically bonds to the glass fibre reinforced layer 7 of synthetic plastics (usually resin) material during the use of the composite sheet as a release sheet. The other face of the glass fibre reinforced layer has the other release sheet 8 carried thereon.

Figure 4A:
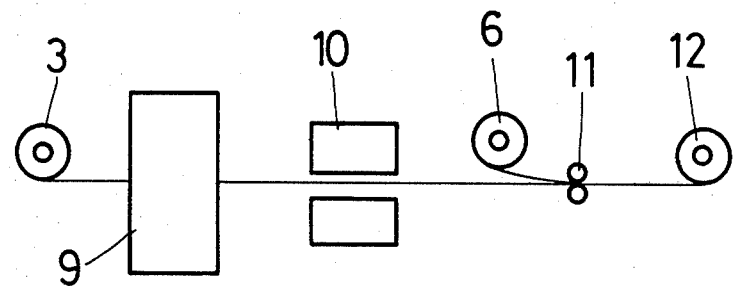
FIGS. 4a and 4b are schematic illustrations of the two parts of a process of this invention wherein a composite release sheet is formed to embody a reflective layer and the release sheet is then employed in the manufacture of a glass fibre reinforced sheet.

A composite sheet as described above can easily be made by a process deposited in FIG. 4a wherein the simple outer film 3 is coated at 9 with a metallizing layer 4 of aluminium or other metal and then has adhesive 5 applied thereto at 10. This adhesive layer 5 is then bonded to the non-heat sealable side of the co-extruded polyester film 6 at 11 and the composite sheet can, for storage or transport purposes, be rolled into suitable sized rolls 12.

Figure 4B:
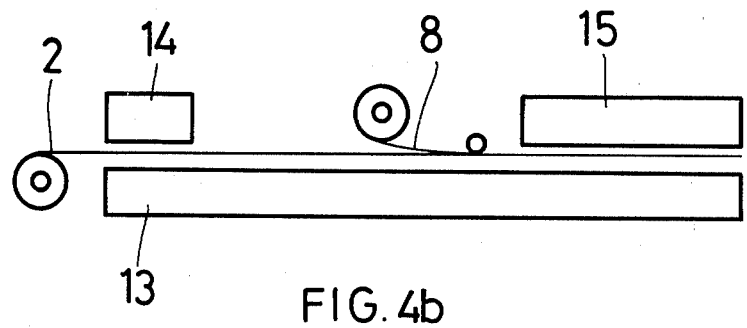

The above described composite plastics sheet is, as depicted in FIG. 4b, laid over the lower half 13 of a sheeting die of conventional structure and shape. A layer of resin and glass fibre reinforcing 7 is then applied to the upper surface of the plastics sheet either manually in known manner or using a chopper gun at position marked 14. The other release sheet 8 is then laid over the glass fibre and resin material 7, and the upper half 15 of the sheeting die is operated to mould the resin to the required shape. After sufficient curing has taken place, the upper half of the sheeting die is released and the composite glass fibre reinforced sheet is removed from the die assembly. The above process is illustrated as being continuous, which it may well be, but wherever required or desired a conventional batch moulding and pressing operation can be carried out in analogous manner.

It will be understood that the above described process for forming the glass fibre reinforced plastics material is substantially conventional with the one release sheet being replaced by the composite sheet described.

In the above use a polyester film is automatically present on the outside of the final sheet material as a result of the structure of the composite plastics sheet. However, in some cases a single sheet or film may carry the reflective layer. In such cases it is preferred to orientate the reflective plastics sheet such that the plastics film base is outermost after moulding of the resin material. This ensures that the extremely thin aluminium or other metal layer is adequately protected from the elements. In any event it is preferred that this side of the sheet will be directly inwardly to provide additional protection to the reflective layer in use.

Figure 3:
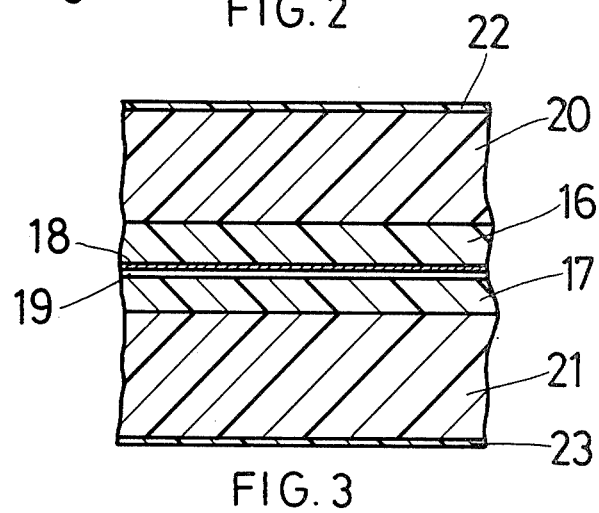

It is also possible, as shown in FIG. 3, to provide a composite sheet as above described but wherein both of the films 16 and 17 between which the metallized layer 18 and adhesive layer 19 are sandwiched are of the type which is heat sealable on the one side and in both cases such side is directed outwardly. Both sides have secured thereto a layer 20 and 21 of glass fibre reinforced plastics material being a release sheet 22, 23 on the ultimately outermost surface.

It will be appreciated that many variations may be made to the above-described embodiments without departing from the scope of the invention. In particular a variety of types of reflective plastics sheets may be bonded to the glass fibre reinforced sheet which will have the effect of greatly improving the solar radiation reflection characteristics as well as optional colour modifications to the glass fibre sheet.

The plastics reflective film could be of any suitable type and could be of a commercially available type such as under the trade name "NUNSUN" film and manufactured by National Metallizing of Princetown, N.J., United States of America.

It must be noted that while the resin and reinforcing glass fibre is preferably moulded onto the reflective plastics sheet, the latter could be applied to a preformed glass fibre reinforced sheet by means of either a pressure sensitive adhesive layer applied to the reflective plastics sheet or by means of a separate adhesive layer. It is also within the scope of this invention to apply a reflective layer such as a thin aluminium layer directly to a surface of preformed glass fibre reinforced plastics sheet and to then cover the layer with a protective coating or sheet of material.

It is believed that use of sheets according to this invention as roofing sheets or fanlights will, in view of the appreciably decreased transmission of solar radiation, will be more successful and thus popular than heretofore. This results from the fact that internal temperature may be maintained at lower levels than where prior art similar sheets were utilized.

What I claim as new and desire to secure by Letters Patent is:

1. A molded, cured translucent, substantially rigid glass fiber reinforced plastic sheeting material, comprising:
    a glass fiber reinforced plastic first layer; and
    a reflective second layer extending over a major portion of an area of said first layer, said reflective second layer comprises a laminate of first and second films of flexible plastic material and a thin metal film, said thin metal film being applied onto a first surface of said first film and being bonded to a first surface of said second film by an adhesive layer, a second surface of said second film being incompletely polymerized and being chemically bonded to said first layer before said second surface of said second film is cured, said metal film being sufficiently thin so that said metal film is capable of transmitting a substantial quantity of visible light and is also capable of reflecting a substantial quantity of sun heat radiant energy.

2. The sheeting material claimed in claim 1 wherein said thin metal film comprises a metal alloy material which is applied to said first surface of said first film by either spraying, precipitation, electro-deposition, or vaporization.

3. The sheeting material claimed in claim 1 wherein said first surface of said second film is substantially fully polymerized and not heat sealable.

4. The sheeting material claimed in claim 1 wherein said thin metal film comprises aluminum which is applied to said first surface of said first film by either spraying, precipitation, electro-deposition, or vaporization.

5. The sheeting material claimed in claim 1 wherein said first layer comprises an epoxy resin.

6. The sheeting material claimed in claim 1 wherein said reflective second layer is directed inwardly with respect to said first layer so that said visible light and said heat radiant energy passes through said first layer prior to encountering said reflective second layer.

7. The sheeting material claimed in claim 1 wherein said first and second laminate films are co-extruded polyester films, and said second surface of said second film is heat sealable by reason of said incomplete polymerization thereof.

8. The sheeting material claimed in claim 1 further comprising a release sheet bonded to an outermost surface of said first layer.

9. The sheeting material claimed in claim 1 wherein a second surface of said first film is heat sealable by reason of incomplete polymerization thereof, and said first surface of said first film is substantially fully polymerized and not heat sealable, a second glass fiber reinforced plastic layer being bonded to said second surface of said first film prior to said second surface of said first film being cured.

10. The sheeting material claimed in claim 9 further comprising at least one release sheet bonded to an outermost surface of either of said first and second glass fiber reinforced plastic layers.

* * * * *